G. YOUNGMAN.
CORN PLANTER ATTACHMENT.
APPLICATION FILED JUNE 8, 1918.
1,291,343.
Patented Jan. 14, 1919.
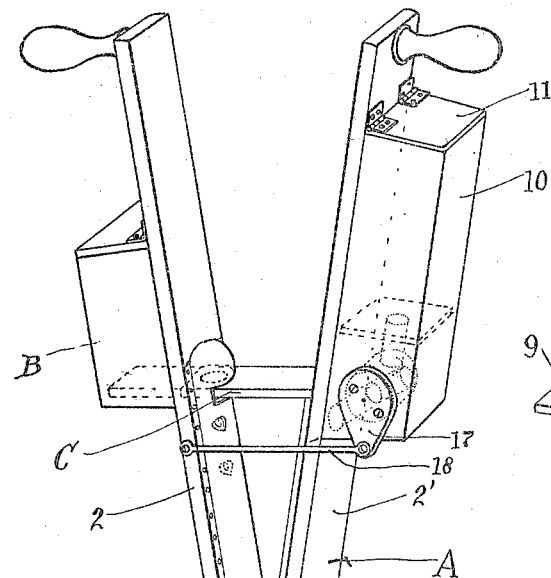
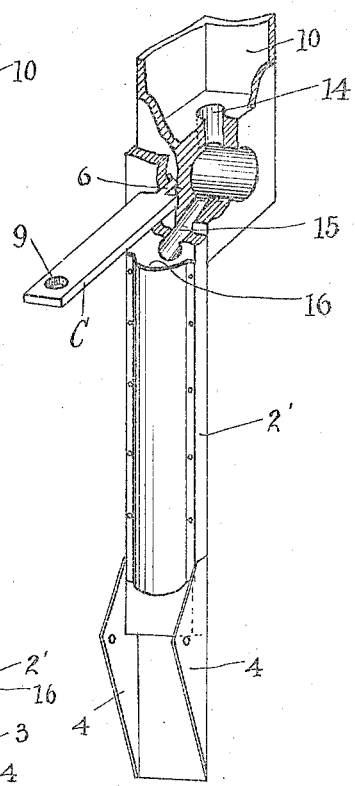
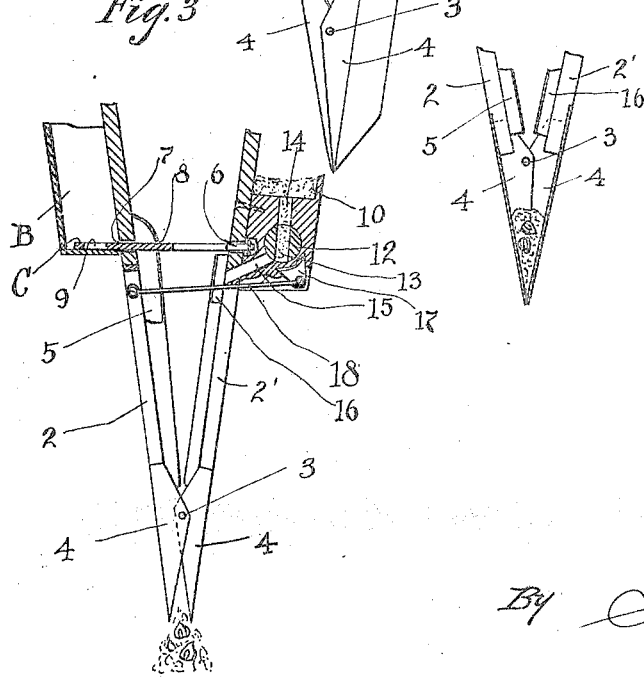
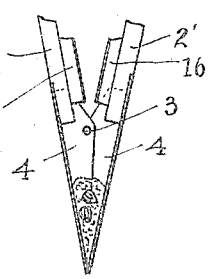
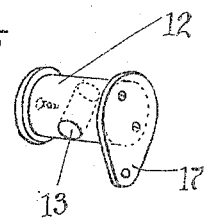
Inventor,
George Youngman
By
his Attorney.

UNITED STATES PATENT OFFICE.

GEORGE YOUNGMAN, OF GLADSTONE, MINNESOTA.

CORN-PLANTER ATTACHMENT.

1,291,343.　　　　　Specification of Letters Patent.　　Patented Jan. 14, 1919.

Application filed June 3, 1918. Serial No. 238,973.

*To all whom it may concern:*

Be it known that I, GEORGE YOUNGMAN, a citizen of the United States, residing at Gladstone, in the county of Ramsey, township of New Canada, and State of Minnesota, route 2, have invented certain new and useful Improvements in Corn-Planter Attachments, of which the following is a specification.

This invention relates to improvements in fertilizer attachments for planting implements and more particularly for hand corn planters.

An object of the invention is to provide a corn planting device useful in small farming, whereby a quantity of fertilizer may be deposited with the seed at each planting operation without involving any special action on the part of the operator other than is at present required in the ordinary hand planter.

A further object is to provide a device that may be cheaply made and which will be light in weight and of simple construction.

The invention consists in the construction, combination and arrangement of parts hereinafter described and claimed.

Figure 1 is a perspective view of the invention,

Fig. 2 is a fragmentary perspective view of a detail partly broken away,

Fig. 3 is a fragmentary sectional side view of the lower portion of the invention, Fig. 4 is a sectional side view of the seed spout, and Fig. 5 is a perspective view of one of the valves.

Referring to the drawings, A represents a frame of a corn planter, B the seed or supply holding box thereon, and C the seed apportioning slide or valve. The frame comprises a pair of upwardly and outwardly extending handle bearing vibratory levers 2 and 2' pivotally joined together near their lower extremities, the pivot 3 forming a fulcrum upon which the levers move when vibrated so as to cause their respective ends to move in opposite directions. The lower ends of the levers are formed with symmetrically disposed sheet metal spouts 4 secured on the levers and carrying the pivot 3 thereof, and forming when the levers are in spread position at their tops, a wedge shaped seed and fertilizer holding receptacle or discharge spout which may be projected into the ground and then caused to open by moving said levers from their spread position.

The seed box B is secured on the outer side of the lever 2, the latter being formed on its inner side with a seed guiding seed duct 5 leading downwardly into the space between the spouts 4. The seed apportioning slide C has pivotal connection 6 with the lever 2' and slidably fits in the alined apertures 7 and 8 in the lever 2 and the wall of the duct 5 respectively and projects into and slides on the floor of the seed box B. An opening 9 in the slide is adapted to receive a charge of seed from the seed box when the levers are brought together as shown in Fig. 3, the charge of seed being carried into the duct 5 when the levers are actuated outwardly.

Obviously, (Fig. 3) when the levers are moved toward each other the spouts 4 separate and discharge their contents, while at the same time, the opening 9 is filling with seed to be carried to the duct 5 in the next subsequent operation.

The fertilizer distributing device is supported on the outer side of the lever 2' and comprises a fertilizer holding receptacle 10 having a hinged cover 11 at its top and fertilizer apportioning and distributing means at its bottom. The apportioning and distributing means comprises a rotary cylindrical valve plug 12 pierced by a transverse passage or port 13, said plug being rotatably mounted in the bottom of the receptacle 10, the upper end of the passage 13 being adapted to register with the downwardly directed passage 14 in said bottom.

A downwardly and inwardly directed passage 15 is adapted to register with the lower end of the passage 13 and leads from the peripheral face of the valve plug, piercing the lever 2' and thus communicating with the interior of the fertilizer duct 16, said duct leading downwardly to the receptacle formed by the spouts 4.

A crank 17 secured to the plug 12 is pivotally connected at its outer end with a connecting rod 18, the latter having pivotal connection at its other end with the lever 2. When the levers 2 and 2' are actuated, the valve plug 12, through the medium of the rod 18, will be caused to rotate until it assumes the position shown in Fig. 3, wherein it is in register with the passage 14 and in position to receive a charge of fertilizer from the supply in receptacle 10.

It will be noted that the passage 15 is now closed. When the levers are moved to their extreme outward normal position the passages 13 and 15 will have moved into register and the passage 14 closed as indicated in dotted lines (Fig. 1), the fertilizer passing through the passage 15 and the duct 16 into the receptacle formed by the spouts 4. Thus a predetermined quantity of seed and fertilizer is separately discharged, first, into the ducts 5 and 16 with each outward movement of the levers, and then into the ground by the return inward movement of the levers.

The quantity of fertilizer constituting a charge may be varied by simply inserting plugs with ports or passages of different capacity.

While applicant has shown the invention as applied to a hand planter, it is to be understood that the applicant can apply his invention to automatic planters.

I claim:

In a planter, in combination with two vibratory levers pivotally joined together, of a supply box on each of said levers, and controlled supply controlling means for each of said boxes, the controlling means for one of said boxes comprising two passages in said box, a rotary valve having a port and rotatable between said two passages to bring its port alternately in register with each of said passages when it is rotated as and for the purpose specified.

In testimony whereof I affix my signature in presence of two witnesses.

GEORGE YOUNGMAN.

Witnesses:
  GEORGE VOELKER,
  F. WINKLER.

Copies of this patent may be obtained for five cents each, by addressing the "Commissioner of Patents, Washington, D. C."